United States Patent
Sung

(10) Patent No.: US 6,457,544 B1
(45) Date of Patent: Oct. 1, 2002

(54) SCOOTER

(76) Inventor: Jui-Chan Sung, No.15, Lane 94, Her Tzoch St., Taichung (TW)

( * ) Notice: Subject to any disclaimer, the term of this patent is extended or adjusted under 35 U.S.C. 154(b) by 0 days.

(21) Appl. No.: 09/934,718

(22) Filed: Aug. 23, 2001

(51) Int. Cl.$^7$ .............................................. B62K 15/00
(52) U.S. Cl. ...................... 180/220; 180/208; 180/217; 280/287; 280/282
(58) Field of Search ................................. 180/218, 219, 180/220, 231, 208, 210, 217, 216, 65.1, 181, 180; 280/287, 282, 220

(56) References Cited

U.S. PATENT DOCUMENTS

| | | | |
|---|---|---|---|
| 3,417,834 A | * 12/1968 | Smith | |
| 3,580,349 A | * 5/1971 | Brennan | 180/27 |
| 4,598,923 A | * 7/1986 | Csizmadia | 280/287 |
| 4,786,070 A | * 11/1988 | Adee | 280/281 LP |
| 5,823,554 A | * 10/1998 | Lau | 280/261 |

FOREIGN PATENT DOCUMENTS

| | | | |
|---|---|---|---|
| GB | 2232131 | * 12/1990 | B62K/15/00 |
| JP | 2-249783 | * 10/1990 | B62K/15/00 |

* cited by examiner

*Primary Examiner*—Avraham Lerner
(74) *Attorney, Agent, or Firm*—Rosenberg, Klein & Lee

(57) ABSTRACT

A scooter includes a front frame has a pivot bracket with a quick release device mounted on the pivot bracket and a head tube attached to the pivot bracket so a steering assembly can be attached to the front frame. A rear frame is slidably connected to the front frame and selectively held in place by a positioning device. A drive axle is mounted in one end of the rear frame and has at least one rear wheel rotatably mounted on the drive axle. A drive device is mounted on the scooter for driving the rear wheel. A carrying case is mounted on the rear frame and adapted for a rider to sit on a top of the carrying case or to hold the scooter after the scooter is folded.

13 Claims, 12 Drawing Sheets

SCOOTER

BACKGROUND OF THE INVENTION

1. Field of the Invention

The present invention relates to a scooter, and more particularly to a scooter that has a foldable frame and a carrying casing to hold the folded scooter for storage or transportation.

2. Description of Related Art

A conventional scooter whether powered electrically or pedal powered has a fixed frame that cannot be folded and mounted in a small carrying case. It is hard to transport when the conventional scooter is broken and take a large volume during storage.

The present invention has arisen to mitigate and/or obviate the disadvantages of the conventional scooter.

SUMMARY OF THE INVENTION

The main objective of the present invention is to provide an improved scooter that has a foldable frame and a carrying case to hold the folded scooter for storage or transportation.

To achieve the objective, a scooter in accordance with the present invention comprises a steering assembly, a frame, a front wheel, at least one rear wheel, a drive device and a carrying case. The steering assembly includes a handlebar, a fork, a head tube and the front wheel. The frame is comprised of a front frame and a rear frame that both have a front end and a rear end and are slidably connected to each other. The front end of the front frame is pivotally connected to the steering assembly so the steering assembly can be folded relative to the frame. At least one rear wheel is mounted at the rear end of the rear frame. The drive device is mounted on the scooter to drive the rear wheel(s). The carrying case with a top is mounted on the rear frame and is adapted to be a seat for a rider or to hold the scooter after the scooter is folded.

Further benefits and advantages of the present invention will become apparent after a careful reading of the detailed description with appropriate reference to the accompanying drawings.

DETAILED DESCRIPTION OF THE INVENTION

Figure 1:
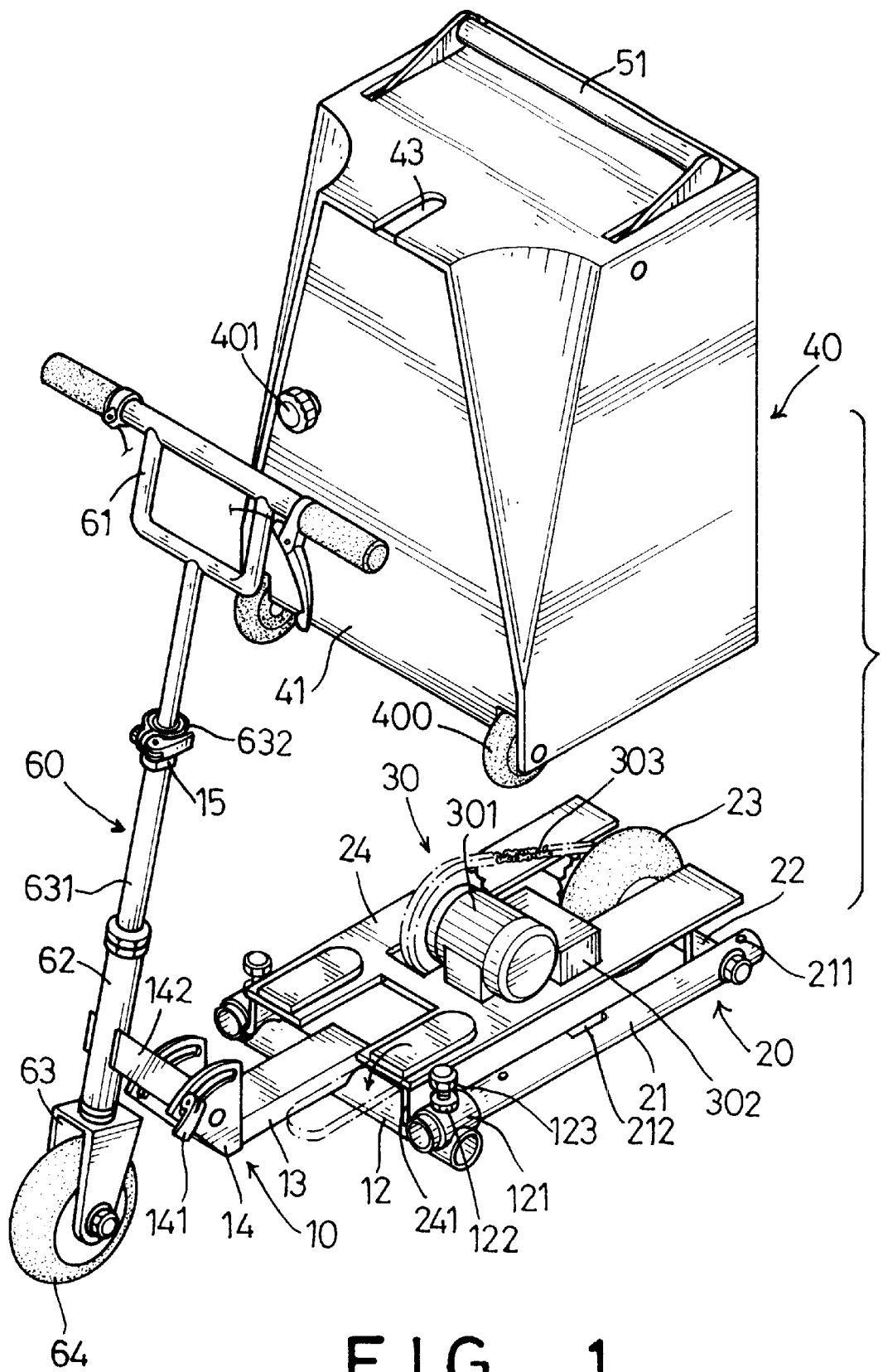
FIG. 1 is a partially exploded perspective view of a scooter in accordance with the present invention.
Figure 2:
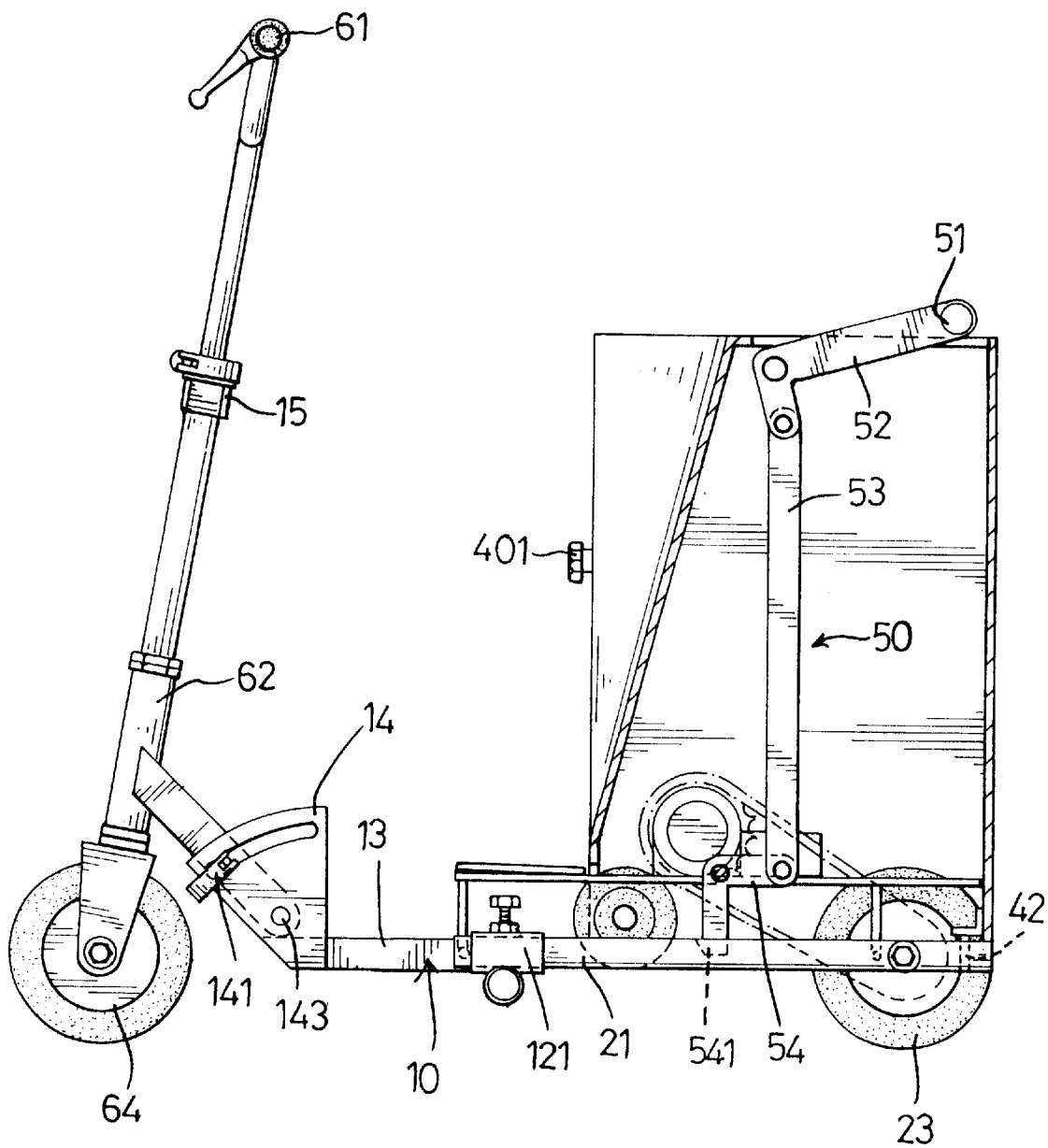
FIG. 2 is a side plan view in partial section of the scooter in FIG. 1.

With reference to the drawings and initially to FIGS. 1 and 2, a scooter in accordance with the present invention comprises a front frame (10), a steering assembly (60), a rear frame (20), a driving device (30) and a carrying case (40). The rear frame (20) is slidably attached to the front frame (10). The carrying case (40) is detachably mounted on the rear frame (20). The carrying case (40) is used as a seat when the scooter is being ridden and as a container to hold the folded scooter for storage or transportation.

The front frame (10) has a front end and a rear end and is T-shaped. The front frame (10) comprises a lateral rod (12), a neck (13), a pivot bracket (14) and a pivot rod (142). The lateral rod (12) is at the rear end of the front frame (10) and has two ends and a middle. The neck (13) has a front end and a rear end with the rear end attached perpendicular to the middle of the lateral rod (12) and the front end extending toward the front end of the front frame (10). The pivot bracket (14) is attached to the front end of the neck (13). The pivot rod (142) has a pivoting end pivotally connected to the pivot bracket (14) with a pivot pin (143). A quick release device (141) is mounted in the pivot bracket (14) and extends through the pivot rod (142) to selectively hold the pivot rod (142) in place. A collar (121) is secured on the lateral rod (12) near each end. The two collars (121) correspond to each other. A frame locking device is secured on an outer periphery of the collar (121). The frame locking device in the preferred embodiment of the present invention is a nut (122), a through hole (not shown) in the collar (21) and a bolt (123). The nut (122) is securely attached to the outer periphery of the collar (121). The through hole (not shown) in the collar (21) corresponds to the hole in the nut (122). The bolt (123) is screwed onto the nut (122) and extends into the through hole in the collar (121). The bolt (123) is selectively screwed into the hole in the collar (121) to hold the rear frame (20) in place.

The steering assembly (60) is comprised of a handlebar (61), a head tube (62), a fork (63) and a front wheel (64). A fixed end of the pivot rod (142) is firmly attached to the head tube (62) so that the head tube (62) can be folded toward the rear frame (20). The front wheel (64) is rotatably mounted on one end of the fork (63). A stem (631) is integrally formed with and extends up from the fork through the head tube (62). The stem (631) is rotatably mounted in the head tube (62). The handlebar (61) is slidably inserted into the head tube (62) and held in position by a quick release clamp (632).

The rear frame (20) is U-shaped. The rear frame (20) comprises two sliding rods (21), a drive axle (22) and a rear wheel (23). Each sliding rod (21) has a first end extending through a corresponding one of the two collars (121) on the front frame (10) and a second end connected by the drive axle (22) to form the U-shape. The rear wheel (23) is rotatably mounted on the drive axle (22) and aligns with the front wheel (64). The bolts (123) are screwed into the collars (121) on the lateral rod (12) of the front frame (10) press against the sliding rod (21) to hold the rear frame (20) in place after the sliding rods (21) are moved to a suitable position. Two through holes (211) are defined in the top of the sliding rod (21) near the two opposite ends of the sliding rod (21) and a locking slot (212) is defined in the top of the sliding rod (21) near the middle of the sliding rod (21).

The drive device (30) can be powered electrically or pedal powered. With reference to FIGS. 1 and 2, the first embodiment of the scooter uses an electrical power source. A support plate (24) is mounted above the rear frame (20) and has four legs (241) respectively attached to the opposite ends of the sliding rods (21). An electric motor (301) and a battery (302) are mounted on the support plate (24). The motor drives the rear wheel (23) by a chain (303) and gears (not numbered).

Figure 3:
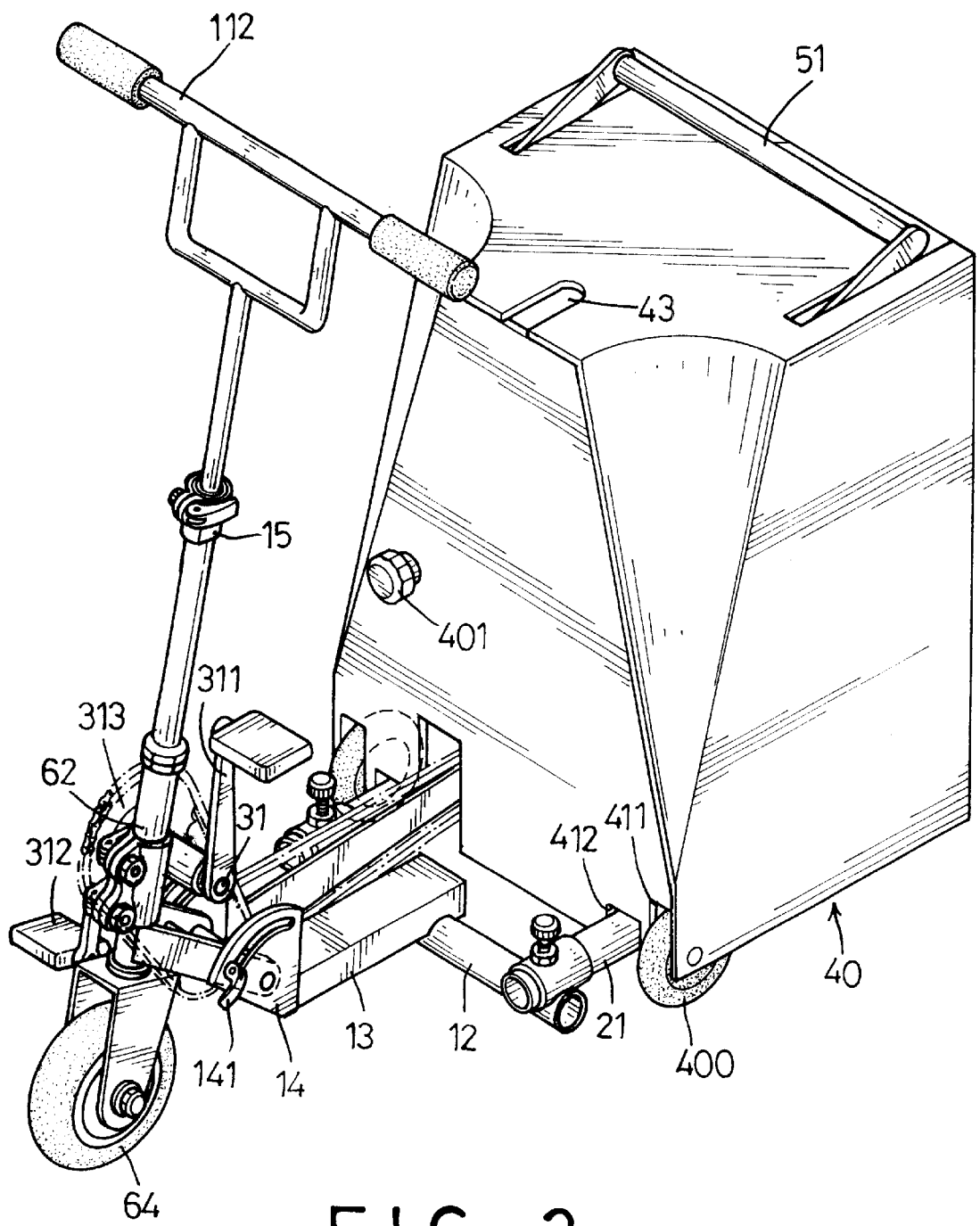
FIG. 3 is perspective view of another embodiment of the scooter in accordance with the present invention.
Figure 4:
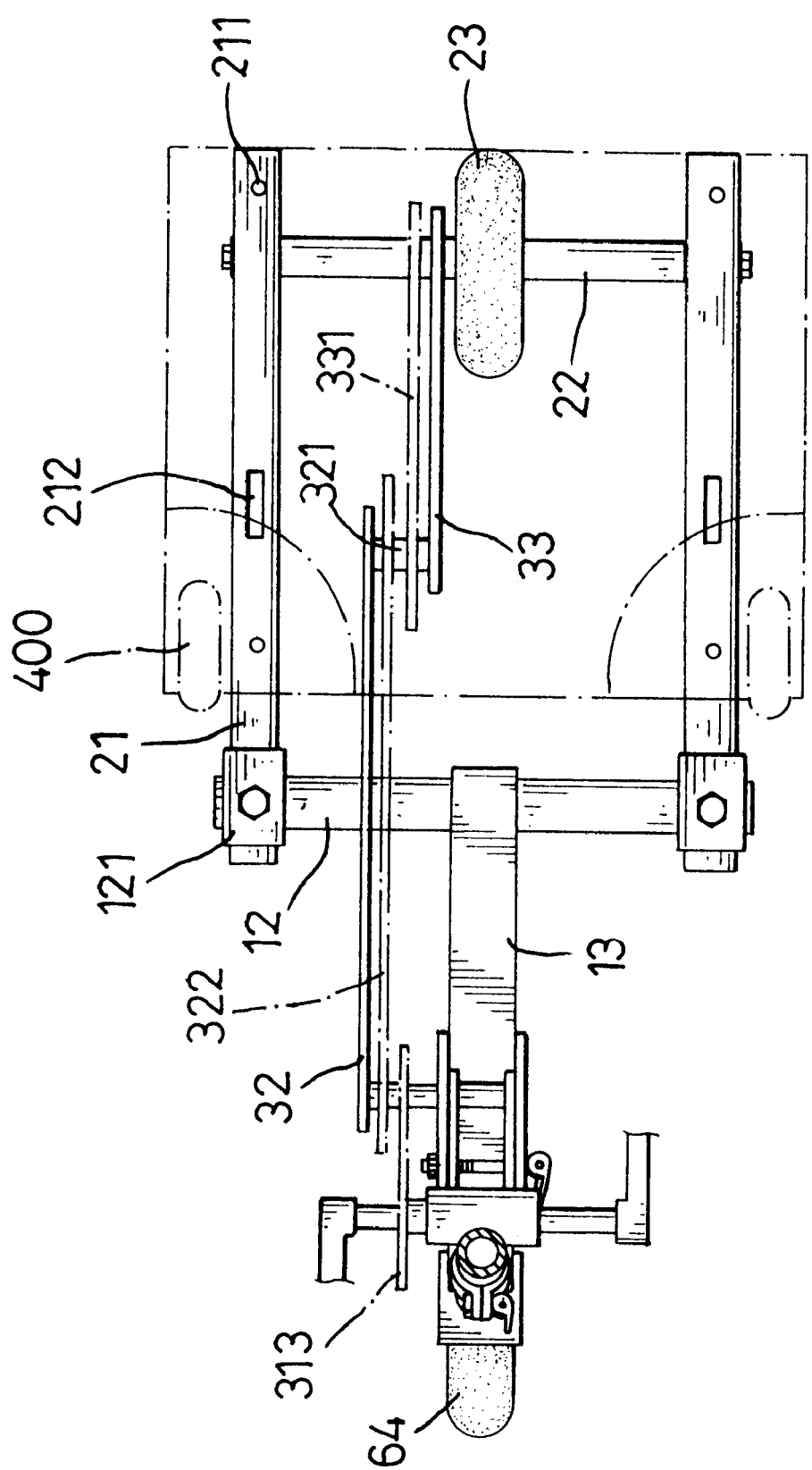
FIG. 4 is a top plan view in partial section of the scooter in FIG. 3.

With reference to FIGS. 3 and 4, the second embodiment of the scooter uses a pedal powered drive device (30) power source. A sprocket axle (31) is rotatably and laterally mounted on the head tube (62) and has two opposite ends each having a pedal arm (311) attached to the sprocket axle (31). A pedal (312) is mounted on a free end of the pedal arm (311). A drive sprocket wheel (313) is attached to the sprocket axle (31). The drive device (30) includes a first spreader arm (32) and a second spreader arm (33) with each having a front end and a rear end. The front end of the first spreader arm (32) is pivotally attached to an extension of the pivot pin (143) that passes through the pivot bracket (14). The front end of the second spreader arm (33) is pivotally connected to the rear end of the first spreader arm (32) by a pivot axle (321). The rear end of the second spreader arm (33) is pivotally connected to the drive axle (22) of the rear frame (20). Two gears are securely mounted on both the pivot pin (143) extension and the pivot-axle (321) so chains (322, 331) are provided to transmit the power and drive the rear wheel(s) (23).

With reference to FIGS. 1, 2, 3, 4, 5 and 6, the carrying case (40) is essentially box shaped with a top, two sides, a front and a back. The top of the carrying case (40) is adapted for rider to sit on the carrying case (40), and a handle slot (43) is defined in the front edge of the top of the carrying case (40). The front of the carrying case (40) facing the steering assembly (60) is used as a door (41) that is hinged on a side edge of the carrying case (40). The door (41) includes a lower edge having two roller slots (411) and two mounting slots (412). The roller slots (411) are defined at two opposite ends of the lower edge of the door (41) so that a roller (400) can be rotatably mounted on the inside of each side of the carrying case (40). The mounting slots (412) are respectively defined near the two roller slots (411) and correspond to the sliding rods (21) of the rear frame (20). A locking member (401) is mounted on the door (41) to hold the door (41) in place when the door (41) is closed. A mounting pin (42) extending down and corresponding to the forward through hole (211) in the sliding rod (21) is mounted on the inside of each side of the carrying case (40) near the door (41). Two more mounting pins (42) corresponding to the rear through holes (211) on the sliding rod (21) are mounted on inside of the back of the carrying case (40). The four mounting pins (42) are inserted into the corresponding through holes (211) in the sliding rods (21) to hold the carrying case (40) in place on the rear frame (20).

Figure 5:
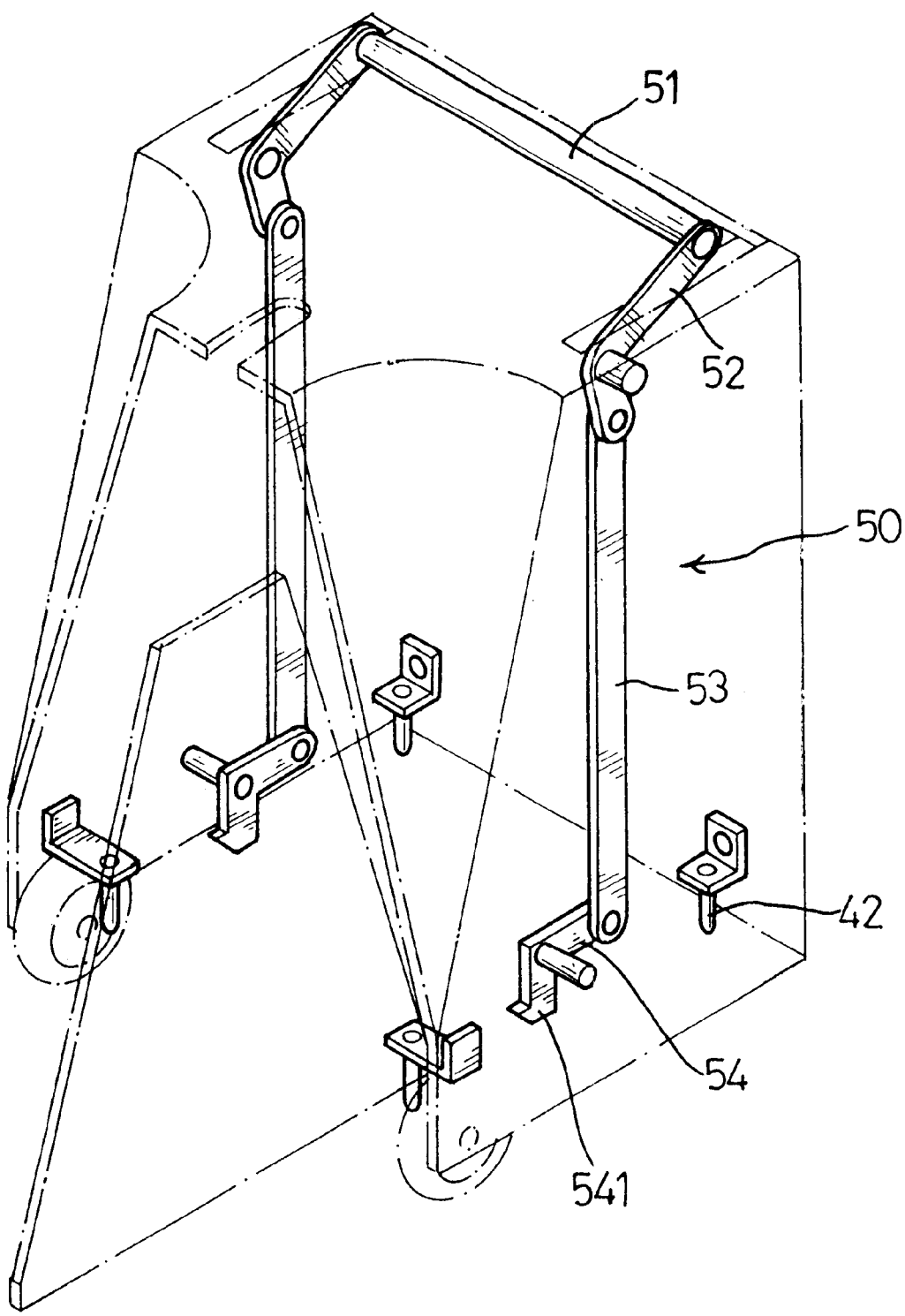
FIG. 5 is a perspective view of the carrying case locking device in accordance with the present invention.
Figure 6:
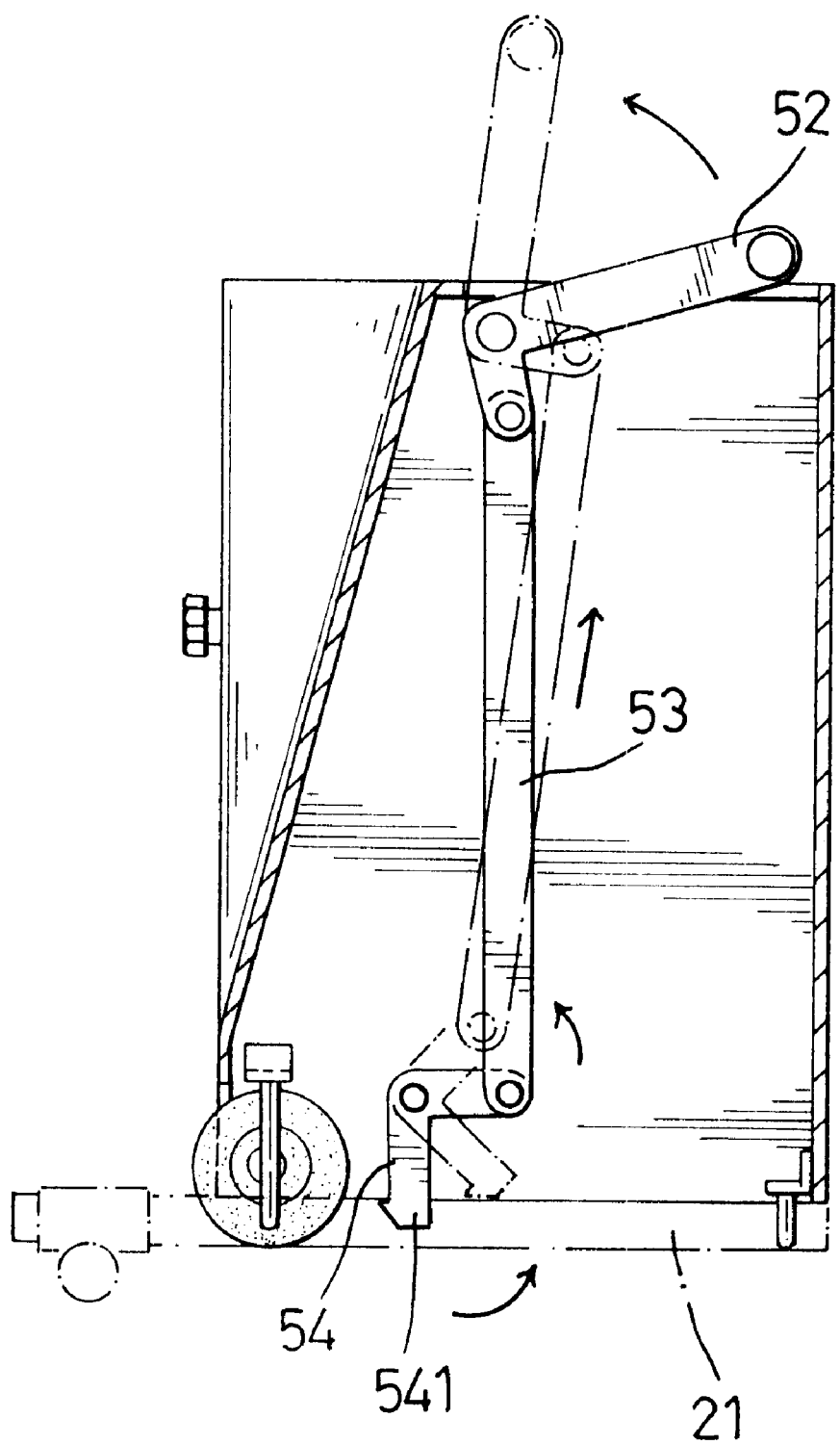
FIG. 6 is an operational side plan view in partial section of the carrying case locking device in FIG. 5.

With reference to FIG. 1, 5 and 6, an inverted U-shaped carrying case locking device (50) is mounted in the carrying case (40) and engages the locking slots (212) in the sliding rods (21) when the carrying case (40) is attached to the rear frame (20). The carrying case locking device (50) comprises an actuating bar (51), two L-shaped side arms (52), two connecting bars (53) and two L-shaped pivot arms (54). The actuating bar (51) has two ends with one end of an L-shaped side arm (52) extending through the top of the carrying case (40) and attached to each-end of the actuating bar (51). Each L-shaped side arm (52) is pivotally attached to the inside of an upper portion of the sides of the carrying case (40) and the other end of each L-shaped side arm (52) is pivotally connected to a connecting bar (53). Two L-shaped locking arms (54) are respectively pivotally attached to the inside of a lower portion of the sides of the carrying case (40). One end of the two L-shaped locking arms (54) is pivotally attached to the end of the connecting bar (53) opposite to the side arms (52). A hook (541) is-formed on the other end of each locking arm (54). The hook (541) engages an edge of the locking slot (212) in the sliding rod (21) to prevent the carrying case (40) from detaching from the rear frame (20).

With reference to FIG. 6, the actuating bar (51) is pulled up to unlock the carrying case (40) from the rear frame (20). When the actuating bar (51) is pulled up, the side arms (52) pivot and lift the connecting bars (53) upward. The connecting bars (53) pull the locking arms (54) causing the locking arms (54) to pivot and draw the hooks (541) away from the edges of the locking slots (212) in the sliding rod (21). The user can then simply lift the carrying case (40) by the actuating bar (51) from the rear frame (20).

Figure 7:
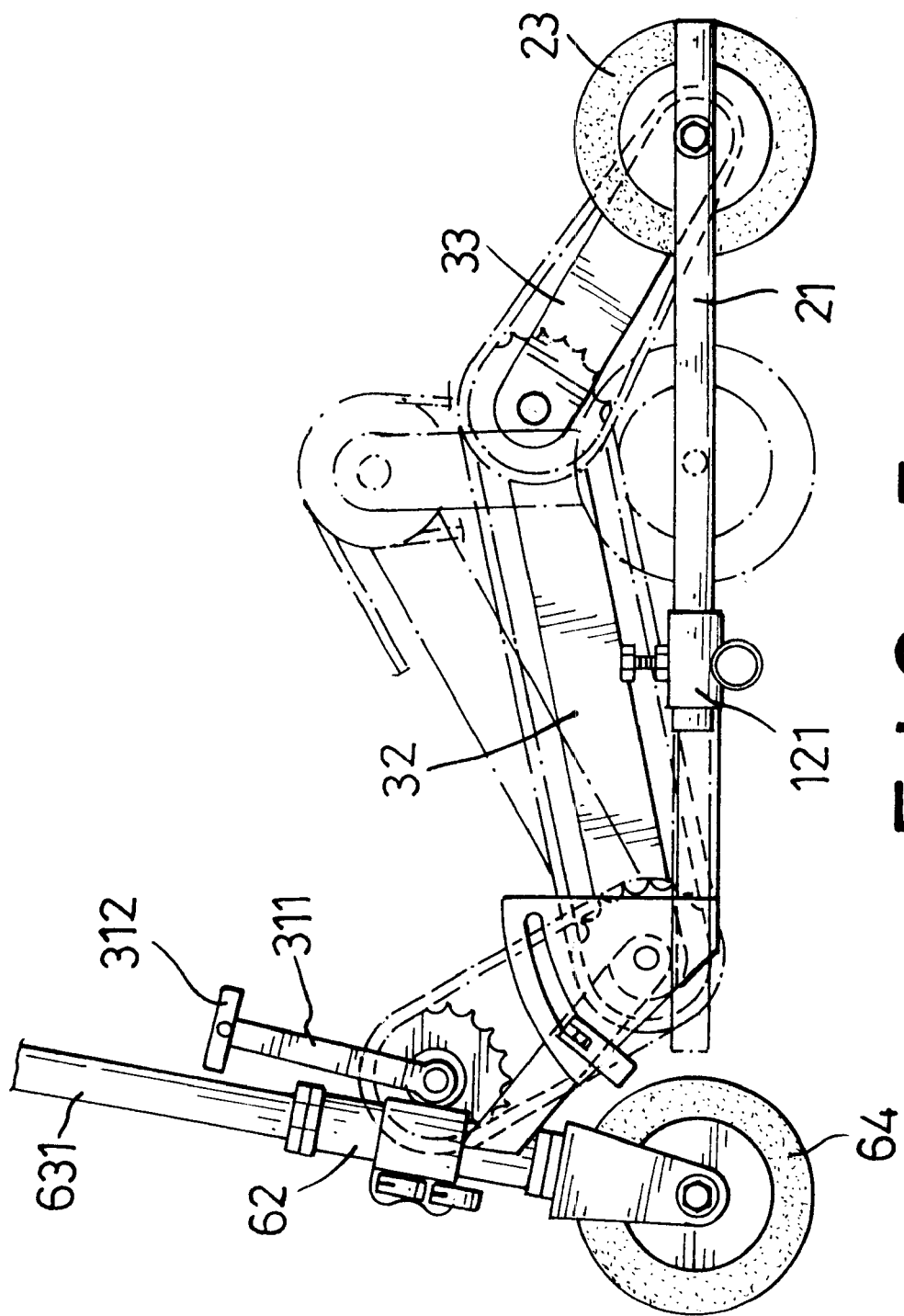
FIG. 7 is an operational side plan view of the frame in FIG. 3.
Figure 8:
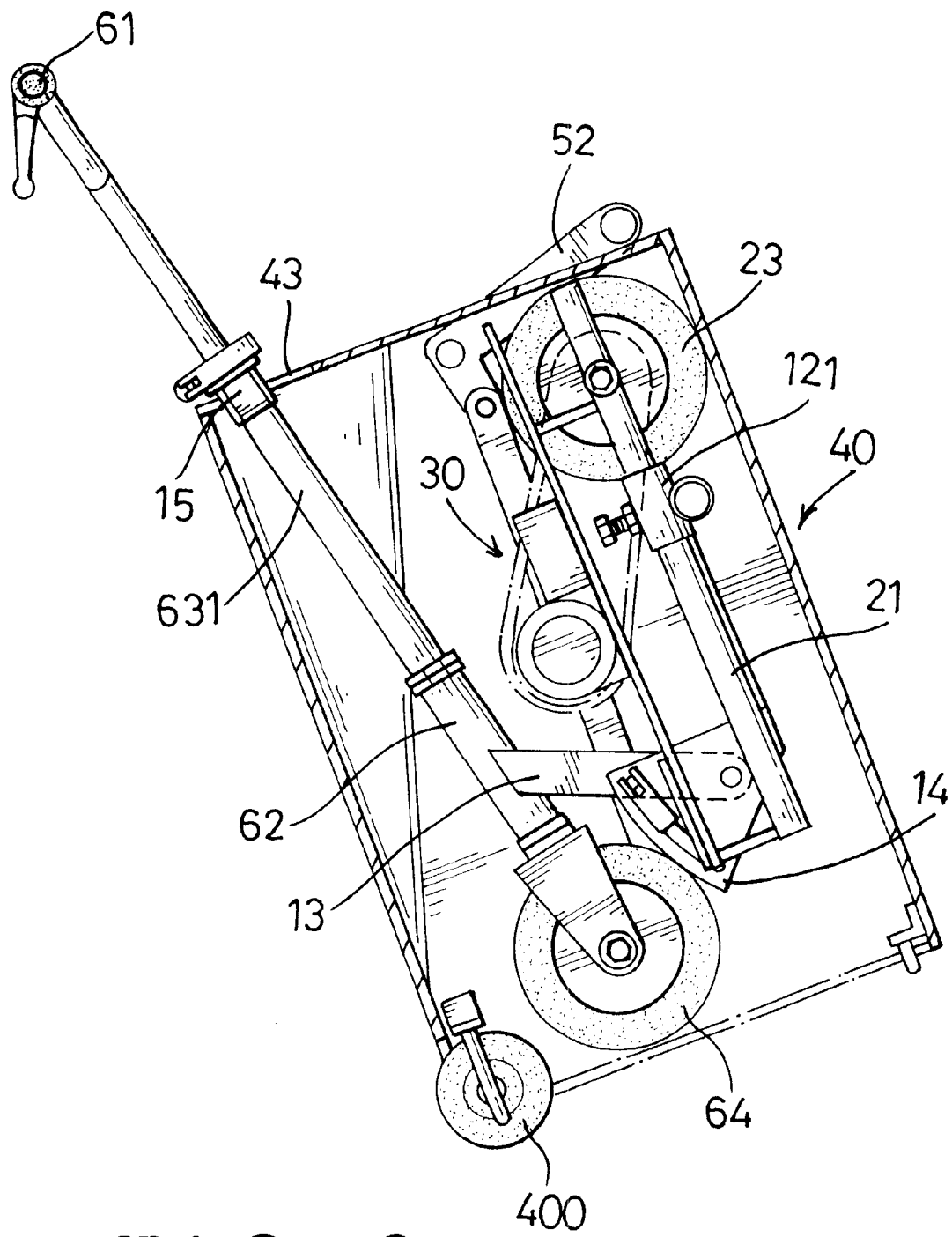
FIG. 8 is a side plan view of the folded frame in the carrying case of the scooter in FIG. 1.
Figure 9:
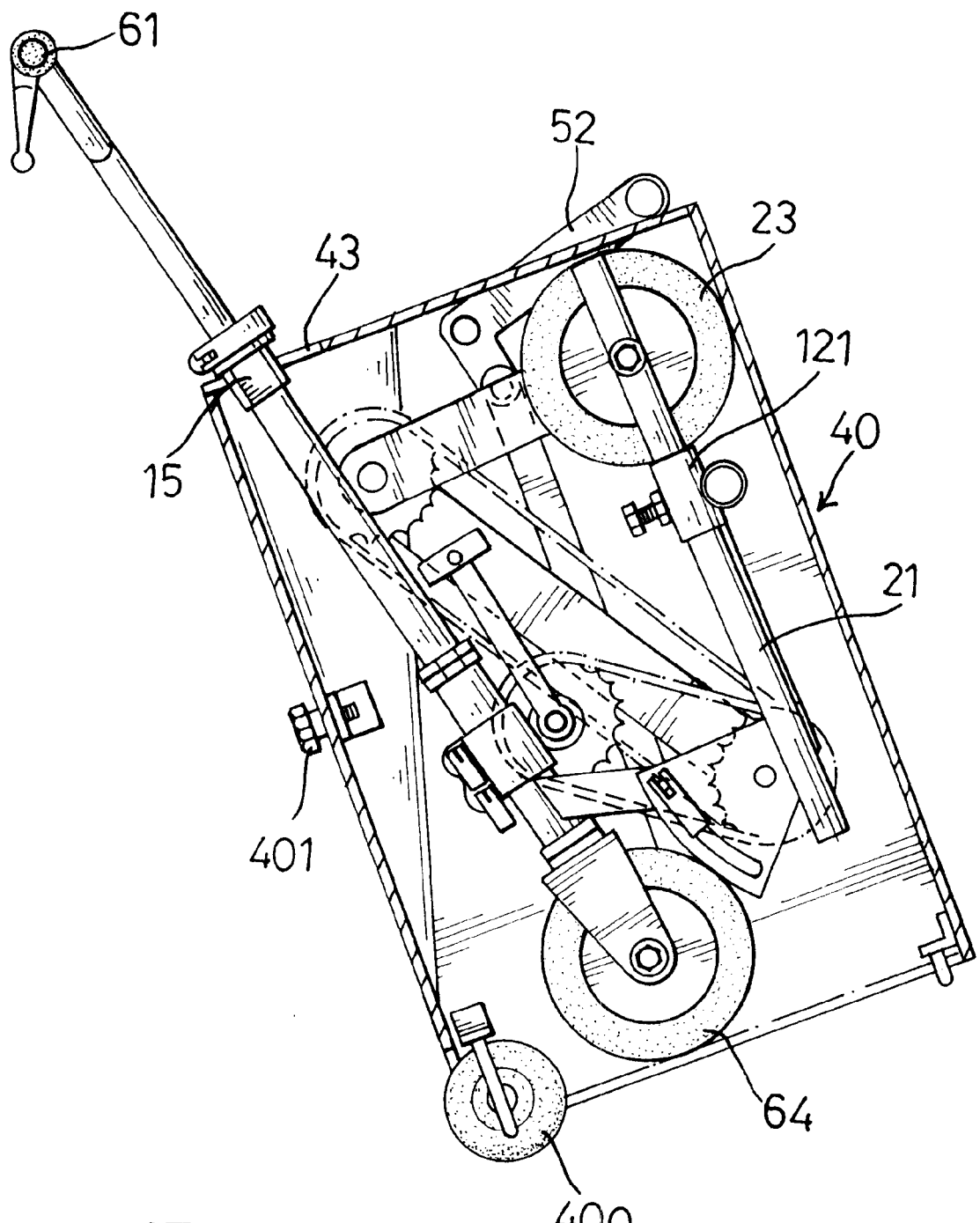
FIG. 9 is a side plan view of the folded frame in the carrying case of the scooter in FIG. 3.

With reference to FIGS. 7, 8 and 9, to fold the present invention, the carrying case (40) is removed from the rear frame (20). Then the bolts (123) in the nuts (122) on the collars (121) on the lateral rod (12) are loosened, and the rear frame (20) is pushed toward the front frame (10). The bolts (123) are tightened again to hold the rear frame in place when the rear frame (20) has been moved to a suitable position. The quick release device (141) on the pivot bracket (14) is released, and the steering assembly (60) is pivoted toward the rear frame (20). The quick release device (141) is fastened again when the steering assembly (60) is moved to a suitable position. The scooter can be inserted in the carrying case (40), and the steering assembly (60) extends through the carrying case (40) via the handle slot (43) in the top of the carrying case (40). The rider can use the carrying case (40) as a seat. Furthermore, the user can hold the handle (61), and pull the carrying case (40) with the two rollers (400) to move the scooter when the scooter is broken. An engaging block (15) is mounted on the stem (631) and corresponds to the handle slot (43) in the top of the carrying case (40). The engaging block (15) is engaged in the handle slot (43) to prevent the handlebar (61) from rotating when the folded scooter is in the carrying case (40).

Figure 10:
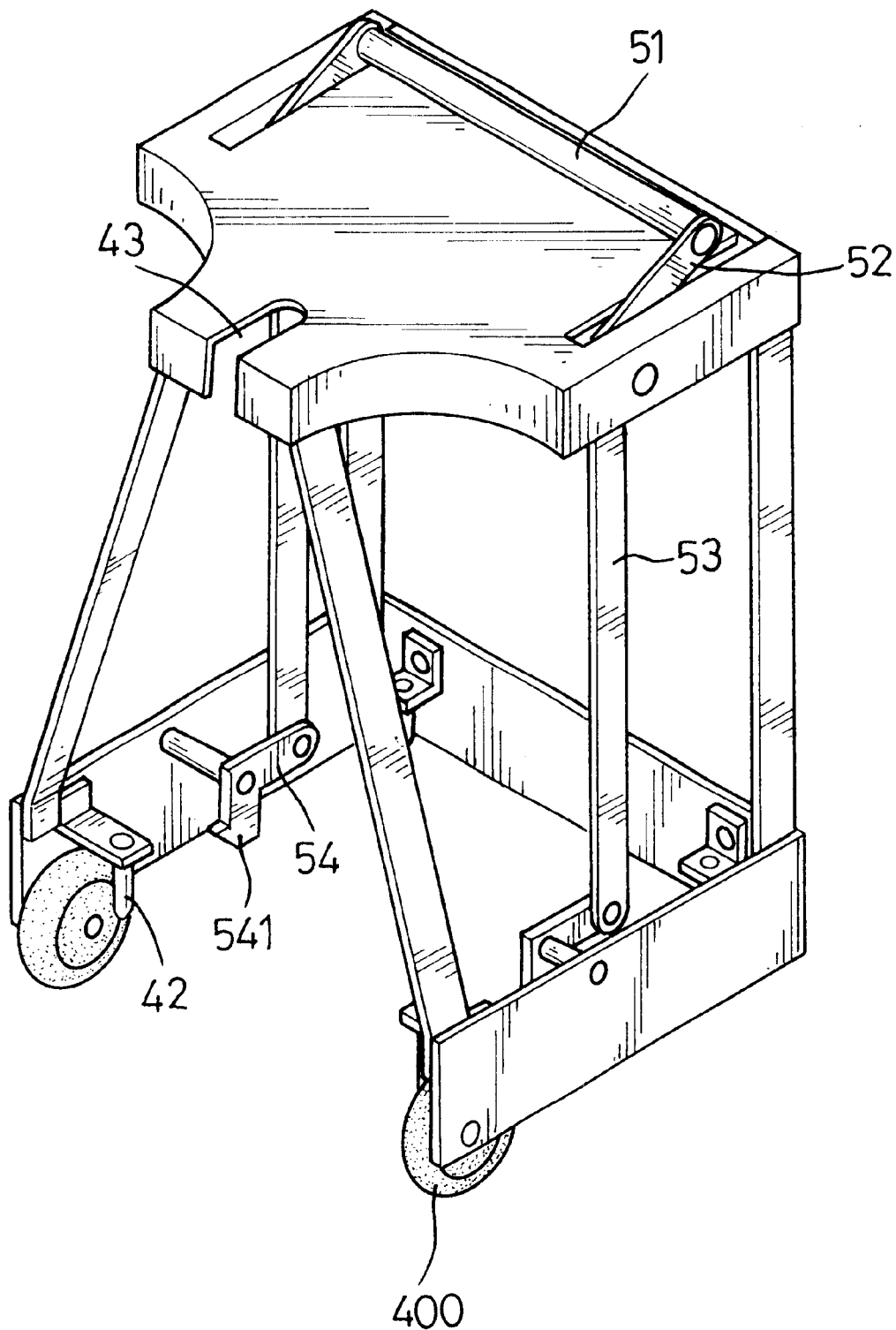
FIG. 10 is perspective view of another embodiment of the carrying case in accordance with the present invention.

With reference to FIG. 10, another embodiment of the carrying case (40) in accordance with the present invention has multiple legs (not numbered) supporting the top. The sidewalls, the door (41) and the back wall have been removed to reduce the manufacturing cost.

Figure 11:
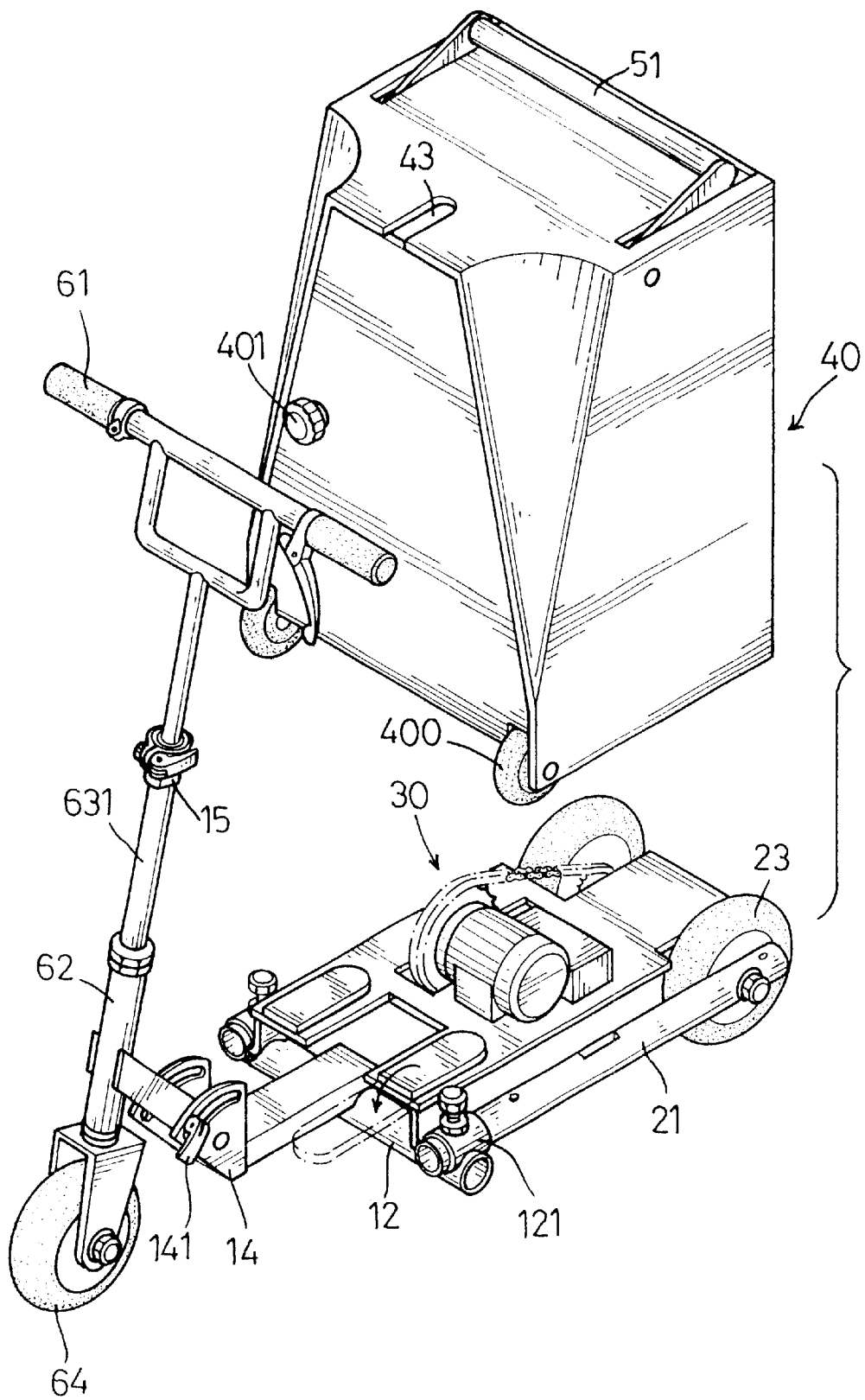
FIG. 11 is a partially exploded perspective of another embodiment of the foldable scooter in accordance with the present invention.
Figure 12:
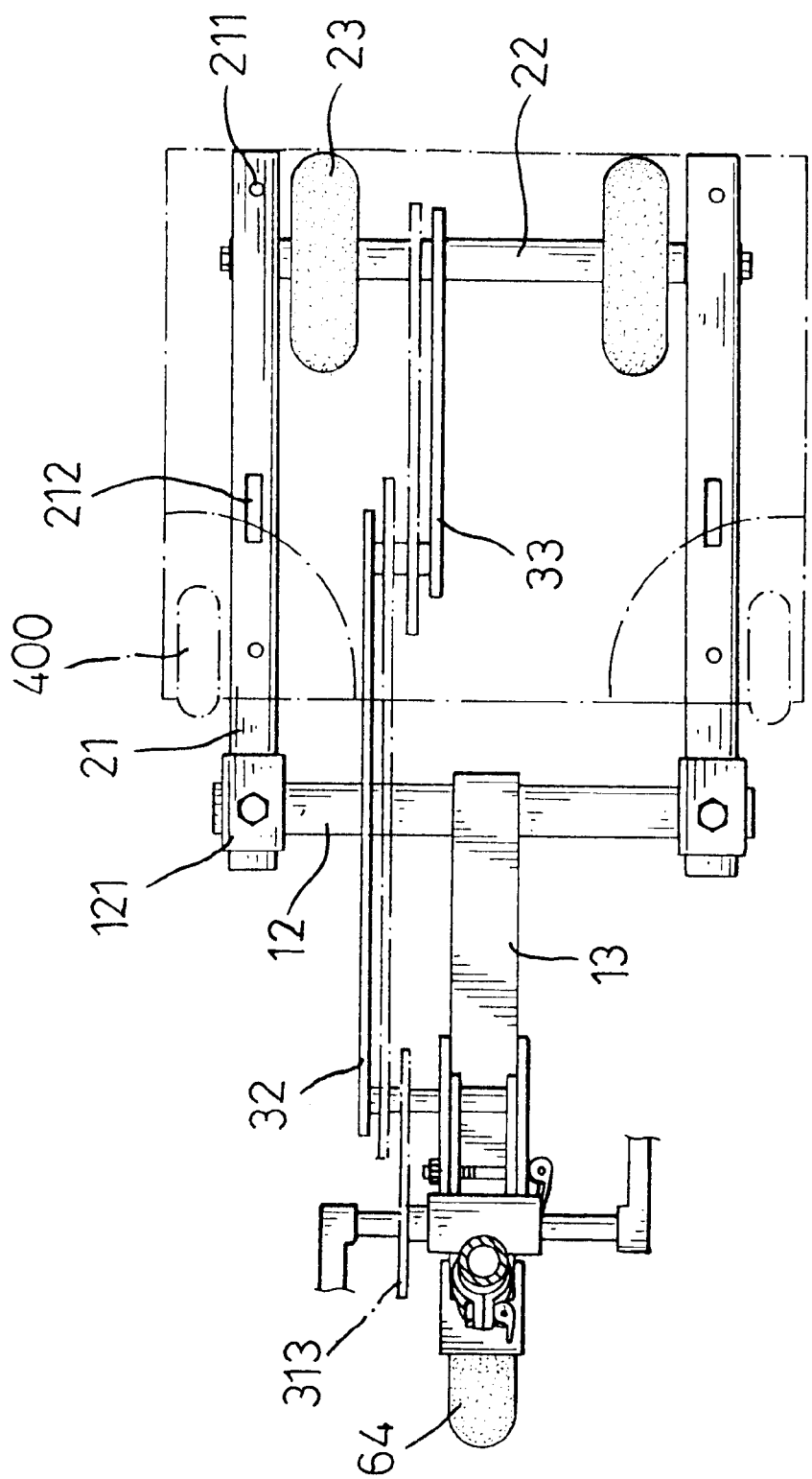
FIG. 12 is a top plan view in partial section of the foldable scooter in FIG. 11.

With reference to FIGS. 11 and 12, another embodiment of the scooter in accordance with the present invention has two rear wheels (23) respectively pivotally mounted near two opposite ends of the drive axle (22). Consequently, this embodiment of the scooter will always stand up right so the scooter is safe for children and elderly people to ride.

Although the invention has been explained in relation to its preferred embodiment, it is to be understood that many other possible modifications and variations can be made without departing from the spirit and scope of the invention as hereinafter claimed.

What is claimed is:
1. A scooter comprising:
  a front frame including:
    a pivot bracket having a quick release device mounted on the pivot bracket; and
    a head tube attached to the pivot bracket to pivotally mount a front wheel and a handle on the front frame;
  a rear frame slidably connected to the front frame and selectively held in place by a positioning device secured on the front frame, a drive axle mounted in one end of the rear frame and having at least one rear wheel rotatably mounted on the drive axle;

a drive device mounted to at least one of the front and rear frames to drive the rear wheel; and a carrying case mounted on the rear frame, the carrying case being adapted for a user to sit on a top of the carrying case and hold the scooter after the scooter is folded;

the front frame having a lateral rod including two opposite ends each having a collar attached to the lateral rod, the positioning device being secured on an outer periphery of the collar to hold the rear frame in place, the rear frame aligning with the front wheel and being U-shaped, the rear frame having two sliding rods respectively movably extending through the collars and being parallel to each other, the drive axle being mounted in one end of the sliding rods opposite to the front frame.

2. The scooter as claimed in claim 1, wherein the positioning device comprises a nut secured on the outer periphery of the collar and a bolt screwed onto the nut, the bolt screwed into and extending through the bolt to press the sliding rod for holding the rear frame in place.

3. The scooter as claimed in claim 1, wherein the rear frame comprises a support plate with four legs respectively attached to opposite ends of the sliding rods, and the drive device is an electric motor and a battery that are mounted on the support plate.

4. The scooter as claimed in claim 1, wherein the drive device comprises:

a sprocket axle pivotally and laterally mounted on the head tube and having two opposite ends each having a pedal arm attached to the sprocket axle;

a pedal mounted on a free end of the pedal arm;

a drive sprocket wheel secured on the sprocket axle; and a first spreader arm and a second spreader arm each having a front end and a rear end, the front end of the first spreader arm pivotally attached to the pivot bracket by a pivot pin extension and the front end of the second spreader arm connected to the rear end of the first spreader arm by a pivotaxle, the rear end of the second spreader arm pivotally connected to the drive axle of the rear frame, two gears mounted on both the pivot pin extension and the pivot-axle to drive chains to transmit the power to drive the rear wheel.

5. A scooter comprising:

a front frame including:

a pivot bracket having a quick release device mounted on the pivot bracket; and a head tube attached to the pivot bracket to pivotally mount a front wheel and a handle on the front frame;

a rear frame slidably connected to the front frame and selectively held in place by a positioning device secured on the front frame, the rear frame including at least a pair of sliding rods offset one from the other, a drive axle mounted in one end of the rear frame and having at least one rear wheel rotatably mounted on the drive axle;

a drive device mounted to at least one of the front and rear frames to drive the rear wheel; and a carrying case mounted on the rear frame, the carrying case being adapted for a user to sit on a top of the carrying case and hold the scooter after the scooter is folded;

the carrying case having one side facing the head tube and a door hinged on one edge of the carrying case, the door having a lower edge, the side including:

two roller slots defined in two opposite ends of the lower edge of the door to receive a roller that is rotatably mounted on each side of the carrying case;

two mounting slots respectively defined near the two roller slots to receive the sliding rods; and a locking member mounted on the door to hold the door in place when the door is closed.

6. The scooter as claimed in claim 5, wherein the rear frame comprises a support plate with four legs respectively attached to opposite ends of the sliding rods, and the drive device is an electric motor and a battery that are mounted on the support plate.

7. The scooter as claimed in claim 7, wherein the drive device comprises:

a sprocket axle pivotally and laterally mounted on the head tube and having two opposite ends each having a pedal arm attached to the sprocket axle;

a pedal mounted on a free end of the pedal arm;

a drive sprocket wheel secured on the sprocket axle; and a first spreader arm and a second; spreader arm each having a front end and a rear end, the front end of the first spreader arm pivotally attached to the pivot bracket by a pivot pin extension and the front end of the second spreader arm pivotally connected to the rear end of the first spreader arm by a pivot-axle, the rear end of the second spreader arm pivotally connected to the drive axle of the rear frame, two gears mounted on both the pivot pin extension and the pivot-axle to drive chains to transmit the power to drive the rear wheel.

8. The scooter as claimed in claim 5, wherein the sliding rod comprises two through holes longitudinally defined in two opposite ends of the sliding rod, and the carrying case comprises two sidewalls each having a mounting pin longitudinally attached near the door and a back wall having two mounting pins longitudinally attached near two opposite sides of the back wall, the mounting pins of the sidewalls and the back wall respectively inserted into the through holes in the sliding rods to hold the carrying case in place.

9. The scooter as claimed in claim 8, wherein the sliding rod comprises a locking slot defined in a top of the sliding rod between the two through holes in the sliding rod and the carrying case comprises a carrying case locking device engaged to an edge of the locking slot in the sliding rod to hold the carrying case in place.

10. The scooter as claimed in claim 9, wherein the carrying case locking device comprises:

an actuating bar with two L-shaped side arms respectively pivotally mounted on an upper portion of the sidewalls of the carrying case;

two L-shaped locking arms respectively pivotally attached to a lower portion of the sidewalls of the carrying case;

a connecting bar having two opposite ends respectively pivotally connected to the side arm and the locking arm; and a hook formed on one end of the locking arm opposite to the connecting bar to engage the edge of the locking slot in the sliding rod.

11. A scooter comprising:

a front frame including:

a pivot bracket having a quick release device mounted on the pivot bracket; and a head tube attached to the pivot bracket to pivotally mount a front wheel and a handle on the front frame;

a rear frame slidably connected to the front frame and selectively held in place by a positioning device secured on the front frame, the rear frame including at least a pair of sliding rods offset one from the other, a drive axle mounted in one end of the rear frame and having at least one rear wheel rotatably mounted on the drive axle;

a drive device mounted to at least one of the front and rear frames to drive the rear wheel; and a carrying case mounted on the rear frame, the carrying case being adapted for a user to sit on a top of the carrying case and hold the scooter after the scooter is folded;

the rear frame having a support plate with four legs respectively secured on opposite ends of the sliding rods, and the drive device is an electric motor and a battery that are mounted on the support plate.

12. A scooter comprising:

a front frame including:
 a pivot bracket having a quick release device mounted on the pivot bracket; and
 a head tube attached to the pivot bracket to pivotally mount a front wheel and a handle on the front frame;

a rear frame slidably connected to the front frame and selectively held in place by a positioning device secured on the front frame, a drive axle mounted in one end of the rear frame and having at least one rear wheel rotatably mounted on the drive axle;

a drive device mounted to at least one of the front and rear frames to drive the rear wheel; and a carrying case mounted on the rear frame, the carrying case being adapted for a user to sit on a top of the carrying case and hold the scooter after the scooter is folded;

the drive device including:
 a sprocket axle pivotally and laterally mounted on the head tube and having two opposite ends each having a pedal arm attached to the sprocket axle;
 a pedal mounted on a free end of each pedal arm;
 a drive sprocket wheel secured on the sprocket axle; and
 a first spreader arm and a second spreader arm each having a front end and a rear end, the front end of the first spreader arm pivotally attached to the pivot bracket by a pivot pin extension, and the front end of the second spreader arm pivotally connected to the rear end of the first spreader arm by a pivot-axle, the rear end of the second spreader arm pivotally connected to the drive axle of the rear frame, two gears mounted on both the pivot pin extension and the pivot-axle to drive chains to transmit the power to drive the rear wheel.

13. A collapsible scooter apparatus comprising:

(a) a collapsible main assembly including:
 (i) a front frame including:
  a pivot bracket having a quick release device mounted on the pivot bracket; and
  a head tube attached to the pivot bracket to pivotally mount a front wheel and a handle on the front frame;
 (ii) a rear frame slidably connected to the front frame and selectively held in place by a positioning device secured on the front frame, a drive axle mounted in one end of the rear frame and having at least one rear wheel rotatably mounted on the drive axle; and,
 (iii) a drive device mounted to at least one of the front and rear frames to drive the rear wheel; and, (b) a carrying case assembly detachably coupled to the rear frame of the main assembly, the carrying case assembly including a housing enclosing a compartment for storing the main assembly in a collapsed configuration, the housing having an upper surface defining a seat for a user when the carrying case assembly is operably coupled to the rear frame.

\* \* \* \* \*